United States Patent
VanSickel et al.

(10) Patent No.: US 12,219,218 B2
(45) Date of Patent: Feb. 4, 2025

(54) SYSTEMS AND METHODS FOR DYNAMIC DISPLAYING OF A PROGRAM GUIDE

(71) Applicant: Sling TV L.L.C., Englewood, CO (US)

(72) Inventors: Seth VanSickel, Englewood, CO (US); Zachary Orner, Englewood, CO (US)

(73) Assignee: Sling TV L.L.C., Englewood, CO (US)

( * ) Notice: Subject to any disclaimer, the term of this patent is extended or adjusted under 35 U.S.C. 154(b) by 0 days.

(21) Appl. No.: 16/727,818

(22) Filed: Dec. 26, 2019

(65) Prior Publication Data

US 2021/0204031 A1    Jul. 1, 2021

(51) Int. Cl.
*H04N 21/482* (2011.01)
*H04N 21/442* (2011.01)
*H04N 21/475* (2011.01)
*H04N 21/485* (2011.01)

(52) U.S. Cl.
CPC ... *H04N 21/4821* (2013.01); *H04N 21/44218* (2013.01); *H04N 21/4755* (2013.01); *H04N 21/4828* (2013.01); *H04N 21/4858* (2013.01)

(58) Field of Classification Search
CPC ........... H04N 21/4821; H04N 21/4828; H04N 21/44218; H04N 21/4755; H04N 21/4858; G06F 3/0482; G06F 3/04842
See application file for complete search history.

(56) References Cited

U.S. PATENT DOCUMENTS

| | | | |
|---|---|---|---|
| 2003/0117430 A1* | 6/2003 | Reynolds | H04N 21/47 715/721 |
| 2005/0204387 A1* | 9/2005 | Knudson | H04N 21/6547 348/E7.071 |
| 2006/0048184 A1* | 3/2006 | Poslinski | H04N 7/163 725/45 |
| 2010/0162322 A1* | 6/2010 | Roberts | H04N 21/47 725/56 |
| 2013/0104160 A1* | 4/2013 | Beeson | H04N 21/482 725/28 |
| 2017/0034569 A1* | 2/2017 | Rasool | H04N 21/42204 |
| 2019/0191208 A1* | 6/2019 | Coenen | G06F 3/038 |
| 2020/0301575 A1* | 9/2020 | Lindholm | G06F 3/04817 |
| 2022/0007075 A1* | 1/2022 | Richter | H04N 21/4542 |

* cited by examiner

Primary Examiner — Oschta I Montoya
(74) Attorney, Agent, or Firm — Perkins Coie LLP (57) ABSTRACT

The present disclosure is directed to systems and methods for dynamically displaying a program guide. In some examples, a first program may be playing in a first portion of the display. A first input may be received that activates a program guide, and the program guide may be overlaid on the first program. The program guide may obscure a portion of the program, while the program continues to play in the background. Further selections may be received within the program guide that may cause the program guide to change display (e.g., expand, become more/less translucent, change position, etc.) without disrupting the program playing in the background. A single input may also be received to dismiss the program guide, regardless of the location in the program guide, allowing the currently playing program to be displayed without obstruction of the program guide.

19 Claims, 6 Drawing Sheets

SYSTEMS AND METHODS FOR DYNAMIC DISPLAYING OF A PROGRAM GUIDE

TECHNICAL FIELD

The present disclosure is related to the field of electronic programming guides and multimedia playback and streaming.

BACKGROUND

Electronic programming guides (EPGs) are applications used within multimedia devices, such as digital set-top boxes, smart devices (e.g., smart TVs), and other devices that are capable of displaying multimedia via satellite, broadband, and/or the Internet. An EPG may provide an organizational layout that shows current and scheduled programs for viewing on live TV, available programs to stream via the Internet, and/or programs that have been previously recorded (e.g., using a digital video recorder (DVR)). The programs may be displayed in the EPG, and short summaries/commentaries and/or artwork may accompany the programs.

Modern multimedia systems that implement an EPG usually stop all multimedia playing/streaming when the EPG is displayed. For example, a user may be watching a program and want to search for a different program. A user may use a remote control to activate the EPG on a display device. The program that is currently playing on the display device may stop in order for the EPG to be displayed. As a result, the user may miss viewing and/or hearing at least a portion of the content that was currently playing on the display device because activating the EPG caused the program to stop playing. The user's consumption of multimedia content decreases because of this issue.

Additionally, modern multimedia systems that implement an EPG do not have an efficient way for a user to quickly toggle out of an EPG to resume watching a program. Typically, if a user is navigating through multiple levels in an EPG (e.g., Recorded Programs—Program A—Season 1—Episode 5—Info), the user must then linearly navigate out of the EPG to return to the program. This results in an unnecessary number of clicks or other actions to dismiss the EPG and return to viewing the program.

As such, there is an increased need to simultaneously display an EPG while continuing to play multimedia content, so that a user may navigate the EPG while also continuing to consume the content from the currently playing program. Furthermore, an increased need exists for a user to quickly toggle out of an EPG to resume watching the currently playing program.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods associated with dynamically displaying an electronic programming guide (EPG). An EPG may be displayed in a multimedia environment. The EPG may be overlaid on a currently playing program. The currently playing program may be a live television program, a program that is streamed over the Internet, a previously-recorded program that is stored in a DVR, etc. The EPG may cover a portion of the screen of a display device, while the currently playing program continues to play/stream in the background. A user may be able to navigate the EPG while continuing to view and listen to the currently playing program. In some example aspects, the EPG may be translucent, so that the program content may still be viewed behind the EPG overlay. In some aspects, the EPG may cover the full screen but remain translucent so the currently playing program may still be viewed behind the EPG. In other aspects, the EPG may appear in a split-screen, so that only a portion of the screen is covered by the EPG, while the other portion continues to display the currently playing program.

In other example aspects, a user may toggle to different programs listed in an EPG, and whichever program is currently selected, a preview may begin playing in the background while the EPG continues to be displayed in the foreground. Based on a subscription level of a user, certain programs may or may not begin playing in the background. For example, a premium subscriber may have access to live previews of certain programs, whereas non-premium subscribers may not have access to the same live previews. A user may be able to navigate to different levels within the EPG and, in a single action, dismiss the EPG and return to the currently playing program.

The EPG may be activated through an action, such as a button click, a gesture (e.g., hand movement, eye-gaze, etc.), and/or a voice command. In some aspects, the currently playing program may be paused while a user navigates the EPG. A program progress bar may be displayed as part of the EPG to indicate the present location of the program in relation to its entire duration. During pause, the program progress bar may indicate to the user the place where the user left off while navigating the EPG. In some aspects, the currently playing program may be an advertisement. In other aspects, the currently playing program may be a live television program, a streaming program, and/or a previously recorded program from a DVR.

Accordingly, the present disclosure provides a plurality of technical benefits including but not limited to: more efficient display of multimedia content while navigating an EPG; enabling consumption of multimedia content through dynamically displaying an EPG without stopping/pausing the currently playing program; and decreasing interruptions in the broadcasting/streaming of program content, which improves overall content distribution among networks (e.g., Internet, broadband, satellite, etc.), among other examples.

Figure 1:
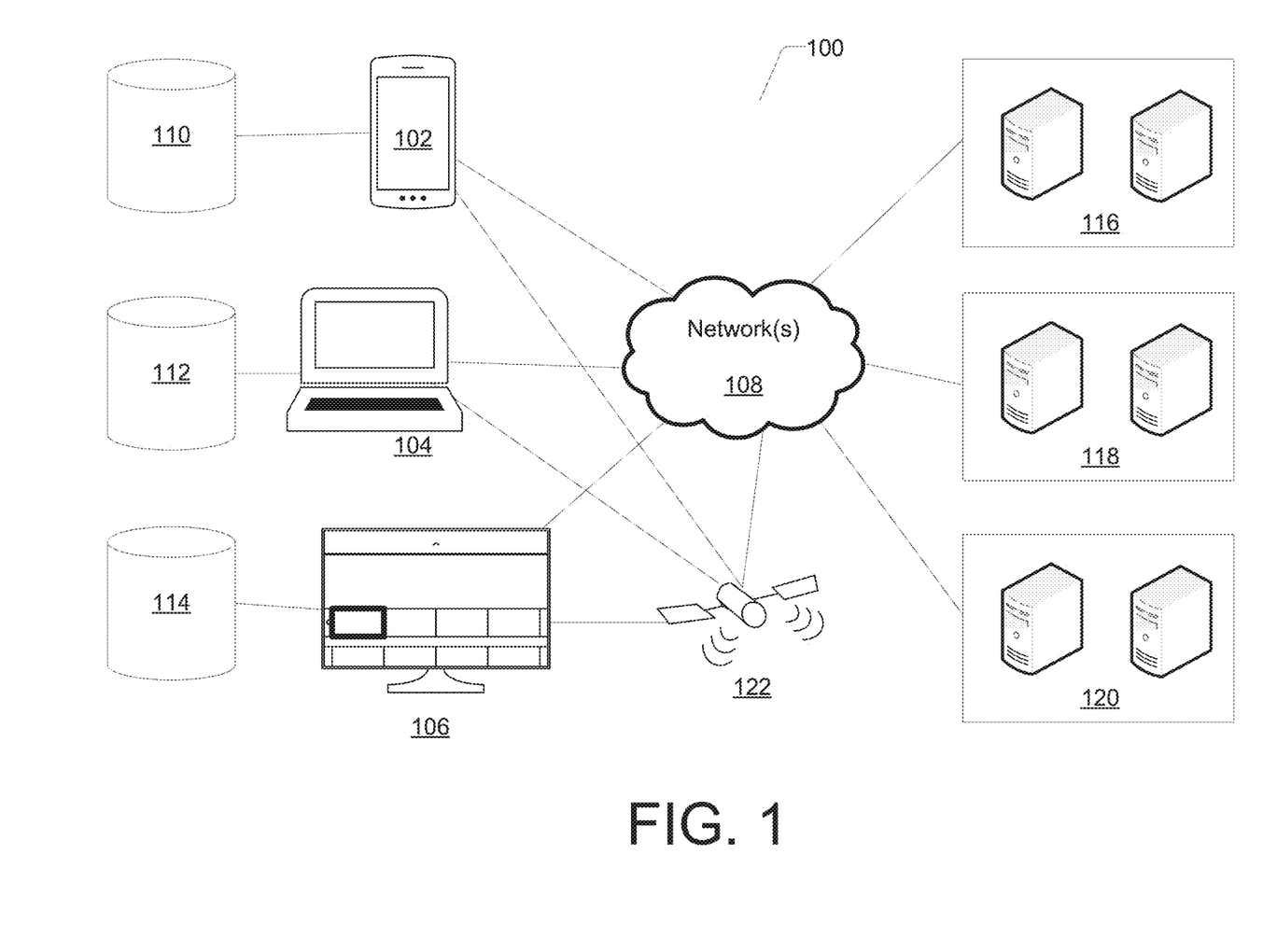
FIG. 1 illustrates an example of a distributed system for dynamically displaying an EPG, as described herein.

FIG. 1 illustrates an example of a distributed system for dynamically displaying an EPG, as described herein. Example system 100 presented is a combination of interdependent components that interact to form an integrated whole for dynamically displaying an EPG. Component of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to identify and play multimedia programs. In aspects, a client device, such as client devices 102, 104, and 106, may have access to one or more data sources and/or databases comprising multimedia programs. In other aspects, client devices 102, 104, and 106, may be equipped to receive live broadband and/or satellite signals carrying multimedia programs to be displayed on a display device, such as client devices 102, 104 and 106 (i.e., mobile phone 102, personal computer 104, and/or television 106). The signals that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a set-top box that is connected to a display device, such as television 106 (or a television that may have set-top box circuitry built into the television mainframe).

Client devices 102, 104, and 106 may be configured to run software that allows for the simultaneously display of an EPG and currently playing program that may be stored locally on the client device or run remotely via network(s) 108. For example, a client device may receive a signal from satellite 122 containing a particular multimedia program to be played. The client device may play the multimedia program and subsequently store the multimedia program locally in databases 110, 112, and/or 114. In alternative scenarios, the multimedia program that is recorded may be transmitted from a client device (e.g., client device 102, 104, and/or 106) via network(s) 108 to be stored remotely on server(s) 116, 118, and/or 120. A user may subsequently access the recorded multimedia program from a local database (110, 112, and/or 114) and/or external database (116, 118, and/or 120), depending on where the recorded multimedia program may be stored. The system may be configured to play a program in the background while an EPG is displayed. The program may be played live (e.g., via satellite 122) or streamed (e.g., via Internet network 108) or locally (e.g., from a local DVR database 114). Regardless of the source of the currently playing program, the EPG may be displayed concurrently with the currently playing program.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may activate an EPG on television 106 by clicking a button a remote control. In other examples, a user may swipe-up on a touchscreen, such as a touchscreen embedded on mobile phone 102. In other instances, a user may make a physical gesture where a motion capture camera receives the gesture. The motion capture camera may be embedded into a set-top box and/or smart device. For instance, a user may make a gesture (e.g., by moving the user's arm in an upwards motion) that activates the EPG. Additionally, a user may be able to activate an EPG using eye motion. An eye-gaze tracker may be embedded into a set-top box and/or smart device. The eye-gaze tracker may also be deployed through a built-in camera in a mobile device (such as mobile device 102). The eye gaze tracker may track the eye movements of a user. For instance, if a user deliberately raises his/her eyes, such a movement may trigger the EPG to display on a device. In other aspects, a user may enter an input on a mobile device (e.g., device 102), where the input may be transmitted via network(s) 108 and received by television 106. The input may activate the EPG on television 106.

In some aspects, a trackpad may be used as an input device to receive actions to activate and/or dismiss an EPG. For instance, the trackpad may receive a gesture that activates the EPG. Subsequent gestures may allow the user to navigate the EPG while the currently playing program continues to play in the background. A gesture may be received by the trackpad that dismisses the EPG, allowing the user to view the currently playing program without the EPG being displayed on the screen.

Various media items may be playing while the EPG is displayed. For example, advertisements may be transmitted over network(s) 108 and/or satellite 122 to client device(s) 102, 104, and/or 106. An advertisement may play in the background while a user navigates the EPG. In other aspects, live previews of the programs through which a user may be toggling within the EPG may play in the background. In some instances, a user's profile may be received by the system to determine whether certain live previews of programs should play in the background. For example, a user profile may be stored remotely on server(s) 116, 118, and/or 120. The user profile may be transmitted to a client device 102, 104, and/or 106. If a user is a premium subscriber, then live previews of certain programs may automatically play in the background while an EPG is displayed. If a user is not a premium subscriber, then live previews of certain programs may not automatically play in the background.

In some examples, the program that may play in the background while an EPG is displayed may be based on various factors, such as time of day (e.g., morning or night), viewing history, user preferences, and/or geolocation. For instance, a user may frequently watch an evening program. When a user turns on the television and activates the EPG during the evening, the frequently-watched evening program may begin playing in the background behind the EPG. In the morning, rather than begin playing the last watched program (e.g., the evening program), the currently playing program may be a frequently-watched morning program. In other aspects, a user's location may determine which programs are available to play.

Because satellite 122 and network(s) 108 are configured to communicate with one another, the systems and methods described herein may be able to assess the source of a particular multimedia program. In other words, the systems and methods may be able to determine that a program scheduled to air on live television (via satellite 122) may already be available on-demand via an Internet-streaming service through network(s) 108. Such communications between satellite 122 and network(s) 108 allow for load-balancing efficiency. For instance, in a household where multiple devices may be connected to network(s) 108 and/or satellite 122, the currently playing program behind the EPG may be derived from a low-utilization source. Specifically, if other devices in a household are using tuners from a set-top box, then the currently-playing program may be streamed from an Internet source over network(s) 108 rather than risk overloading the tuners and broadcasting a program via satellite 122. The system and methods described herein may first cross-check any Internet-streaming service libraries to which the user may already be subscribed, in addition to checking any on-demand libraries that may exist in a DVR (stored locally at 110, 112, and/or 114 and/or remotely at servers 116, 118, and/or 120). In some situations, bandwidth may be decreased and throughput may be increased because the systems and methods described herein are able to determine the most efficient source from which to display certain programs.

Figure 2:
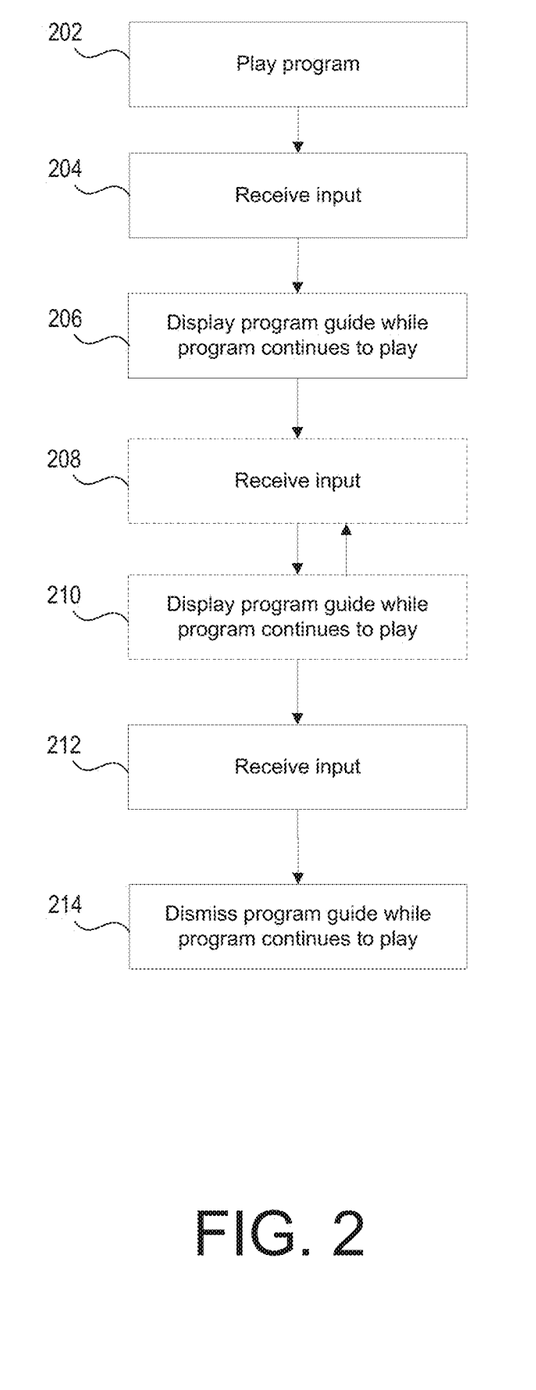
FIG. 2 illustrates an example method for dynamically displaying an EPG, as described herein.

FIG. 2 illustrates an example method for dynamically displaying an EPG, as described herein. The method begins with step 202 where a multimedia program begins to play on a device (e.g., client device(s) 102, 104, and/or 106). The program may be a live broadcast program, an Internet-streamed program, and/or a program previously recorded and stored in a DVR database. While the program is playing, the method may then advance to step 204, receive first input. Input may be received by a user that activates an EPG. The input may be a click on a remote control, a physical gesture (e.g., a movement in front of a motion-capture camera, a movement on a trackpad device, an eye movement captured by eye-gaze tracking systems, etc.), and/or a voice command. The first input may activate an EPG to display on a client device (step 206). The EPG may appear as an overlay on top of the currently playing program. As such, the currently playing program may continue to progress, and the user may still be able to view at least a portion of the program and hear the audio transmissions from the program while the EPG is displayed. The EPG may be partially translucent in some scenarios. In other scenarios, the EPG may be displayed on the bottom half of the screen. In yet other scenarios, the EPG may be displayed in a smaller portion of the screen, so that the user may continue to watch and listen to the currently playing program while navigating the EPG. Once the first input is received at step 204, the EPG may be displayed at step 206.

In some example aspects, once the EPG is displayed at step 206, the user may continue to navigate to deeper levels within the EPG. For instance, a user may decide to search for a certain television program, beginning with the search bar. The system may receive a second input at step 208 that allows the user to navigate to the search interface within the EPG. After receiving the second input at step 208, the search interface within the EPG may be displayed at step 210. These steps may be repeated multiple times, depending on how many levels the user wishes to navigate within the EPG. For instance, the search results may display the desired television series, and the user may then select the television series. A number of seasons may be displayed for the selected television series, and the user may select a certain season. Within that season, a number of episodes may be displayed. At this point, the user may be at least four levels deep into the EPG (e.g., (1) Search—(2) Television Series—(3) Seasons—(4) Episodes).

Steps 208 and 210 may be repeated a number times and are optional. For example, a user may activate the EPG and then subsequently dismiss the EPG without navigating to a deeper level than the initial homescreen of the EPG. Regardless of how many levels a user may navigate within the EPG, the currently playing program may continue to play in the background. In some instances, whatever program the user is currently toggling within the EPG may begin playing. A live preview may begin playing if a user is toggling a certain program within the EPG. In other aspects, certain advertisements may play in the background behind the EPG while the user continues to navigate the EPG.

In some examples, the second input may be a channel change input while the EPG is displayed. For instance, an EPG may be displayed as an overlay while a live television program is being broadcast. A user may then change the channel of the currently playing program without dismissing the EPG. The program playing in the background may change, while the EPG remains in the same state as it was before the background program was changed.

In other example aspects, the input may be a command to change the layout of the EPG. For instance, the input at step 208 may be to change the EPG display from half-screen to three-quarter-screen display. The user may change the translucence of the EPG and may change the position of the EPG (e.g., displaying on the top or bottom half of the screen). In any and all configurations of the EPG, the program in the background may continue to play interrupted.

In yet other aspects, a user may wish to pause the background program while the EPG is displayed. The input received at step 208 may be a pause command. The currently playing program may pause, and the current location may be indicated in a program progress bar that is a part of the EPG. The program progress bar may indicate to the user the exact location within the program where the user selected to pause and/or stop the program.

When the user wants to dismiss the EPG, an input may be received at step 212. The input may be a mechanical action (e.g., button click on a remote), a gesture (e.g., physical movement, trackpad gesture, eye-gaze movement, etc.), and/or a voice command. The input may cause the EPG to be dismissed at step 214. For instance, a user may be multiple levels deep within an EPG, and in a single input, the EPG may be dismissed, and the currently playing program may be displayed in the full screen.

Figure 3:
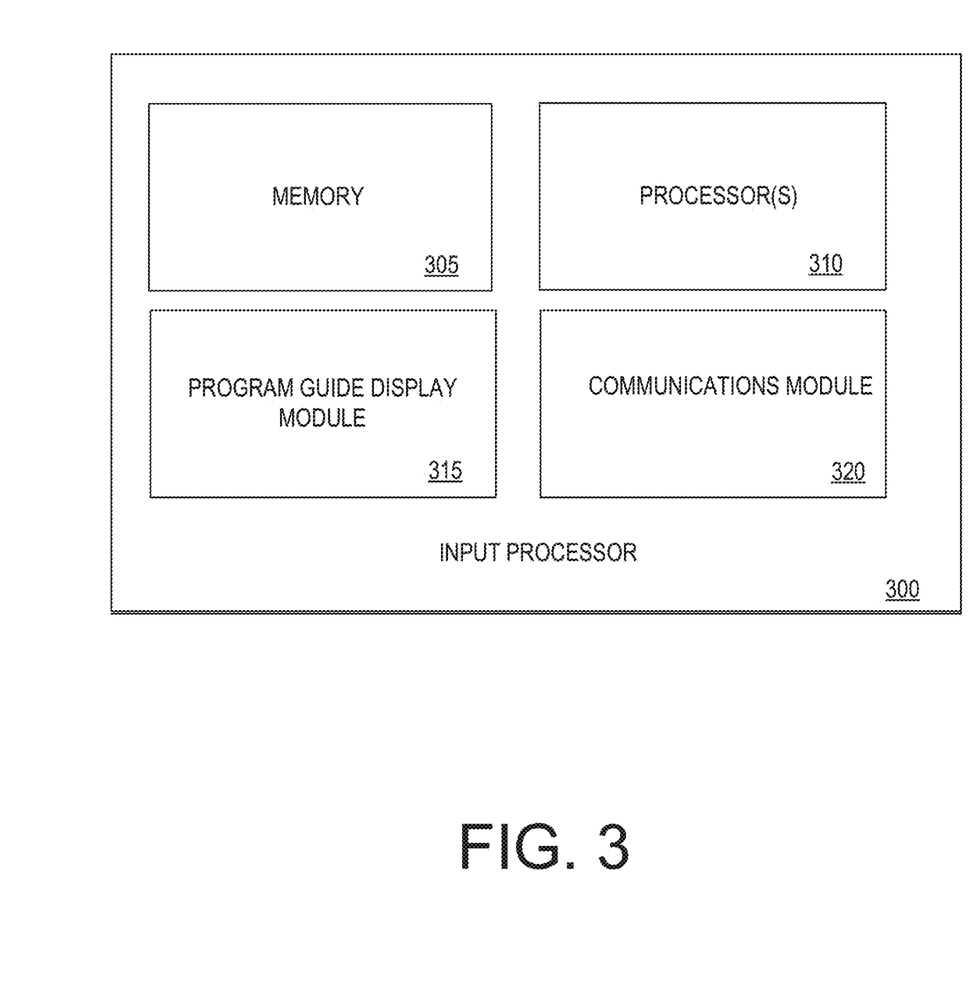
FIG. 3 illustrates an example input processor that is configured to implement the systems and methods described herein.

FIG. 3 illustrates an example input processor that is configured to implement the systems and methods described herein. Input processor 300 may be embedded within a client device (E.g., client devices 102, 104, and/or 106), remote web server device (e.g., devices 116, 118, and/or 120), set-top boxes, televisions, smart televisions, and other devices capable of dynamically displaying an EPG. The input processing system contains one or more data processors and is capable of executing algorithms, software routines, and/or instructions based on processing data provided by a variety of sources related to the selection of a multimedia item for recording (e.g., intelligently via a machine-learning algorithm and/or manually by a user). The input processing system can be a factory-fitted system or an add-on unit to a particular device. Furthermore, the input processing system can be a general-purpose computer or a dedicated, special-purpose computer. No limitations are imposed on the location of the input processing system relative to a client, remote web server device, television, set-top box, etc. According to embodiments shown in FIG. 3, the disclosed system can include memory 305, one or more processors 310, program guide display module 315, and communications module 320. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 305 can store instructions for running one or more applications or modules on processor(S) 310. For example, memory 305 could be used in one or more embodiments to house all or some of the instructions needed to execute the functionality of program guide display module 315 and communications module 320. Generally, memory 305 can include any device, mechanism, or populated data structure used for storing information. In accordance with some embodiments of the present disclosures, memory 305 can encompass, but is not limited to, any type of volatile memory, nonvolatile memory, and dynamic memory. For example, memory 305 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 305.

Program guide display module 315 may be configured to run a portion of the operation steps described in FIG. 2, particularly the dynamic display of the EPG. Module 315 may be configured to receive inputs that allow the customization of the EPG. For instance, module 315 may configure the EPG to be more or less translucent, display different color schemes for the EPG, position the EPG in different areas of a screen (e.g., top or bottom half), alter the size of the EPG in relation to the screen, etc. In other instances, module 315 may communicate with network(s) 108 and/or satellite 122 so that certain preview of programs may play in the background behind the EPG. For instance, a user may be toggling/hovering over a certain program displayed in a list of programs within the EPG. A live preview of that toggled program may begin to play in the background behind the EPG. Module 315 may receive the input from the user toggling over the program within the EPG. Module 315 may then communicate that information to network(s) 108 and/or satellite 122 from which a live preview of the toggled program may be retrieved and played in the background behind the EPG.

In other example scenarios, module 315 may communicate a user's navigation history within the EPG to the systems and methods described herein. Certain advertisements may be retrieved via network(s) 108 and/or satellite 122 that may concurrently play in the background while the user continues to navigate the EPG. The advertisements may be related to a user's current search patterns within the EPG. Specifically, if a user is searching for a certain sports channel within the EPG, an advertisement for a sports store may play in the background while the user continues to navigate the EPG. Metadata associated with the user's navigation history within the EPG may be collected by module 315 and stored locally or remotely. Such data may be used by the systems and methods described herein to curate relevant advertisements and other multimedia content to display for the user.

Communications module 320 is associated with sending/receiving information (e.g., collected by program guide display module 315, such as commands received via client devices or remotes, navigation history within the EPG, etc.) with other client devices, remote web servers, set-top boxes, televisions, remotes, etc. These communications can employ any suitable type of technology, such as Bluetooth, WiFi, WiMax, cellular (e.g., 5G), single hop communication, multi-hop communication, Dedicated Short Range Communications (DSRC), or a proprietary communication protocol. In some embodiments, communications module 320 sends information received by program guide display module 315 to client device(s) 102, 104, and/or 106, as well as remote server(s) 116, 118, and/or 120 via network(s) 108 and/or satellite 122. In other examples, communications module 320 may communicate a command to program guide display module 315 that is received from a client device, remote web server, remote, television, and/or other mechanism initiating a command to display, navigate, and/or dismiss an EPG.

Figure 4A:
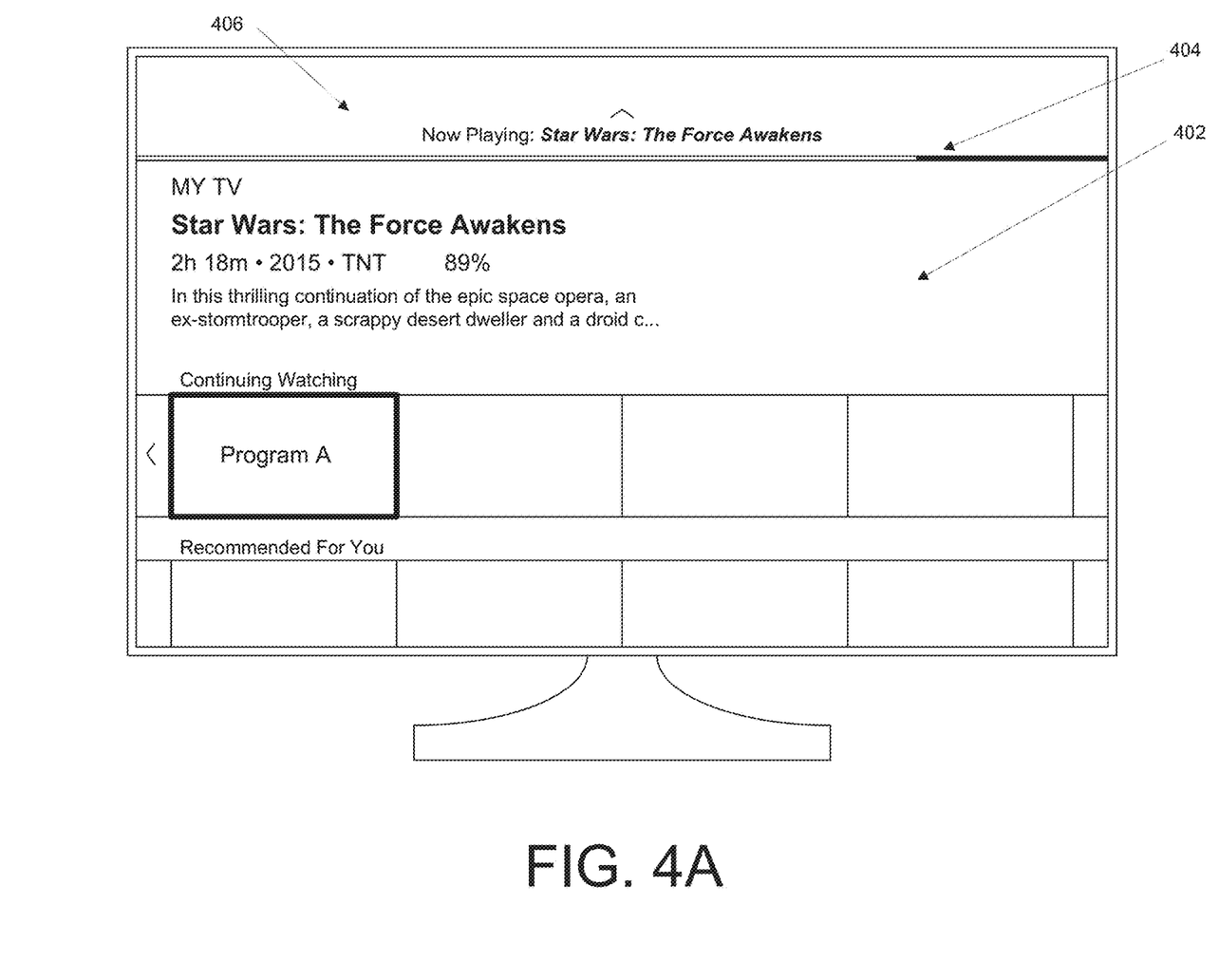
FIG. 4A illustrates an example display device with an electronic program guide overlaid on a currently playing program.

FIG. 4A illustrates an example display device with an electronic program guide overlaid on a currently playing program. The EPG 402 is displayed on top of the currently playing program 406. A program progress bar 404 indicates the location of the currently playing program 406 in relation to the entire duration of program 406. As previously described, the EPG 402 may be translucent and/or display various color schemes that allow the user to simultaneously navigate EPG 402 and continue watching the program 406 in the background. A user may navigate the EPG 402 using various input actions (e.g., mechanical clicks on a remote, physical gestures, voice commands, etc.) without interrupting the program 406 playing in the background.

As displayed in FIG. 4A, a user is toggling over Program A. Program A may be "Star Wars: The Force Awakens" as displayed. In such a scenario, the information for Program A may be displayed, and Program A may continue playing in the background (as program 406). In other scenarios, Program A may represent a different program than "Star Wars: The Force Awakens." In such instances, the currently playing program (Star Wars) may continue to play while the user navigates the EPG. In some examples, the currently playing program 406 (Star Wars) may switch to a live preview of the toggled program (Program A). A live preview of Program A may begin playing a program 406, while the EPG 402 continues to display.

In some example aspects, a live preview of Program A may be displayed as program 406 based on a user's subscription tier. If a user is a premium subscriber and has access to watch Program A, then a live preview of Program A may play as program 406. In other instances where the user does not have access to Program A, a live preview may not begin playing as program 406. Rather, the currently playing program (Star Wars) may continue playing, and a live preview of Program A may not play.

Figure 4B:
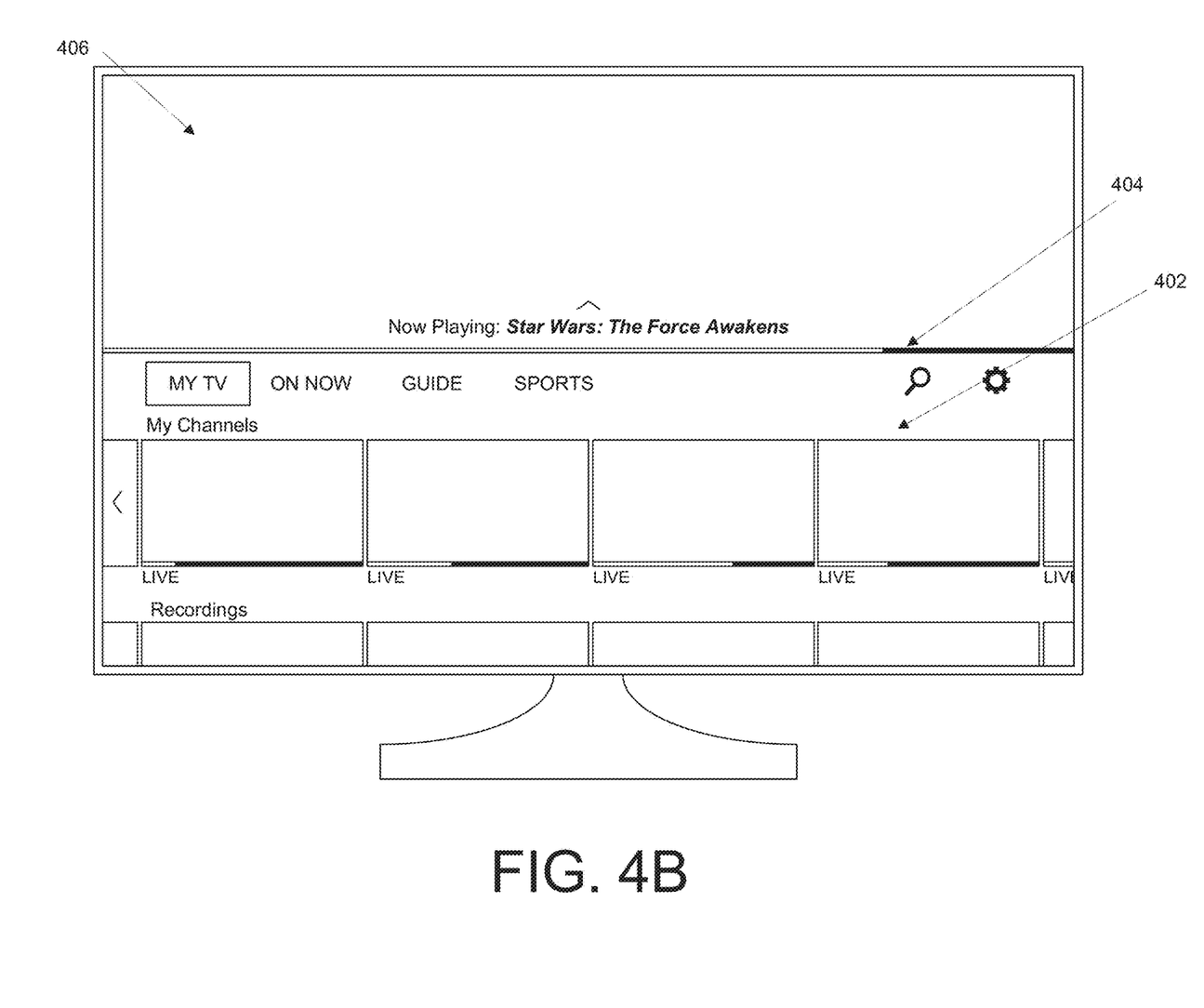
FIG. 4B illustrates an example display device with an electronic program guide overlaid on a currently playing program.

FIG. 4B illustrates an example display device with an electronic program guide overlaid on a currently playing program. As illustrated, EPG 402 is now in a half-screen configuration, allowing more of program 406 to be displayed. Such configuration of the EPG may be done manually or automatically by the systems and methods described herein. In some examples, based on the underlying content of program 406, EPG 402 may be positioned differently. For instance, if the majority of the action/focus of program 406 is occurring in the bottom of the screen, EPG 402 may be repositioned to the top-half of the screen rather than the bottom half, so the user may have an unobstructed view of the underlying content of program 406 while still simultaneously navigating EPG 402.

In FIG. 4B, a user may be currently watching program 406, which may be an Internet-streamed program and/or previously-recorded program stored in a DVR database. Program 406 may continue to play in the background, even though the user is now searching for programs on "LIVE" television. In some instances, the currently playing program 406 may continue to play in the background while the user navigates EPG 402 until the user makes an active selection to change the program. In other instances, if a user is toggling a certain program (including a live television program), the underlying program 406 may switch to that content while still displaying the EPG 402. For instance, if a user toggles over a live television program for a certain duration of time, program 406 may change from "Star Wars: The Force Awakens" to that live television channel. In other instances, a user may be able to manually control the content of program 406 and configure settings that enable or disable live previews and/or automatic switching of program content while the EPG is displayed.

In any configuration of EPG 402, a user may dismiss the EPG in a single action, such as a certain mechanical input (e.g., button click), physical gesture (e.g., arm or hand movement, trackpad gesture, eye-gaze movement, etc.), and/or voice command. The EPG 402 may be dismissed, and program 406 may be displayed on the full screen without any EPG obstruction.

In some instances, EPG 402 may automatically be dismissed if no input is received after a certain amount of time. If the EPG 402 is idle for, e.g., 30 seconds, the EPG 402 may be automatically dismissed from the screen.

With regard to FIGS. 4A and 4B, an EPG (e.g., EPG 402) may be launched in a first (or default) mode that partially obscures the playing program 406 without adjusting the position or size of the program content. For instance, launching the EPG may result in a configuration as illustrated by FIG. 4B, wherein the program 406 continues to play in the background, as the EPG 402 partially obscures the content. A subsequent selection within the EPG may then cause the EPG to further obscure the program content. For instance, a user may navigate to another level of content within EPG 402, resulting in the EPG expanding to obscure more of the program 406 (e.g., EPG 402 obscures more of the program 406 in Figure A than Figure B). In such scenarios, the program content may not be entirely obscured by the EPG. As described, a single gesture may remove the EPG from the screen. For example, a single swipe-up gesture may remove the EPG from the screen, regardless of the location within the EPG, and the currently playing program will be displayed full screen.

Figure 5:
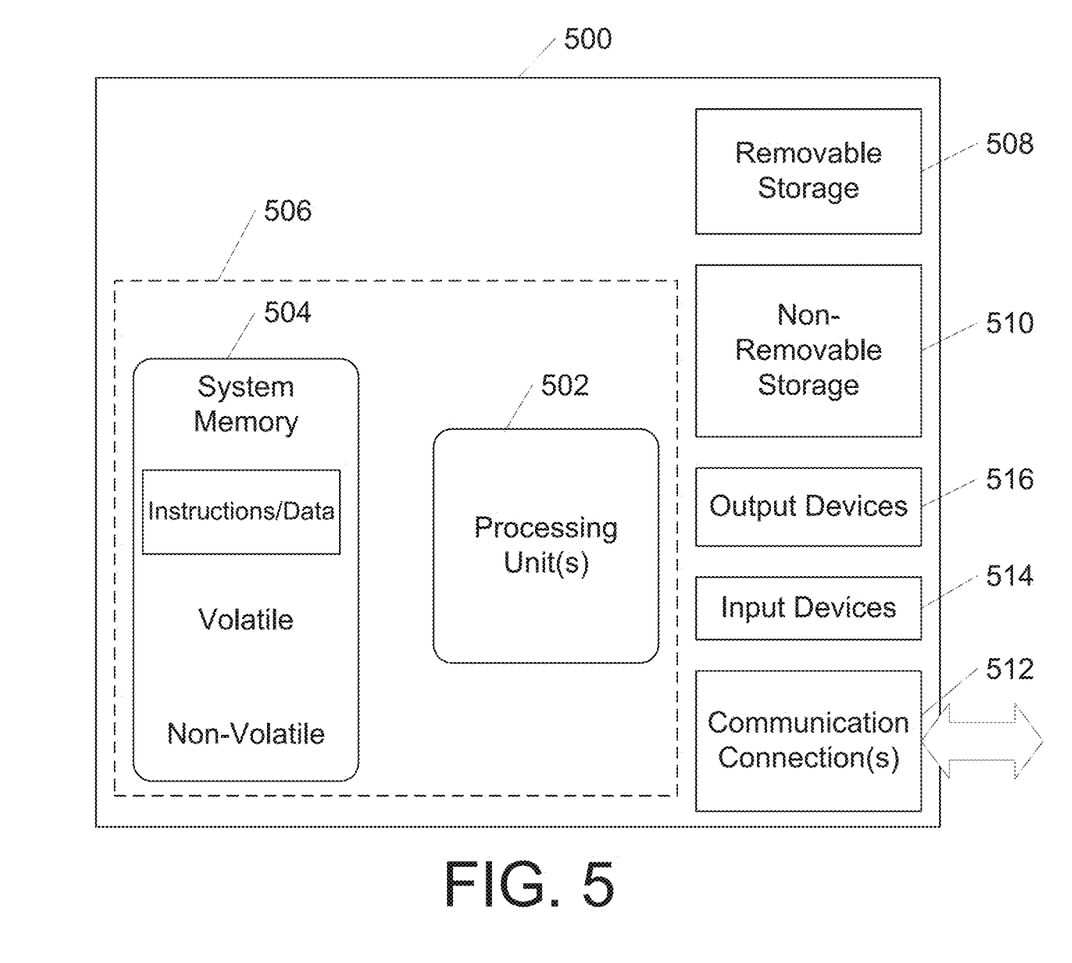
FIG. 5 illustrates one example of a suitable operating environment in which one or more of the present embodiments may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A system for dynamically displaying a program guide, comprising:
    a memory configured to store non-transitory computer readable instructions; and
    a processor communicatively coupled to the memory, wherein the processor, when executing the non-transitory computer readable instructions, is configured to:
    play a first program in a first portion of a display;
    receive a first input, wherein the first input activates the program guide;
    overlay the program guide on the first program in a second portion of the display, wherein the first program continues to play in the first portion of the display;
    receive a second input, wherein the second input resizes the program guide in a third portion of the display;
    receive a third input, wherein the third input is a selection of a second program within the program guide;
    play a preview of the second program in a background of the display, wherein the first portion is a foreground portion, wherein the preview of the second program is played in response to a determination regarding time of day and a viewing frequency; and
    based on the selection of the second program, play an advertisement in the first portion of the display, wherein the advertisement is associated with the second program.

2. The system of claim 1, wherein the processor is further configured to receive a fourth input, wherein the fourth input causes a first level to be displayed within the program guide and wherein the first program continues to play in the first portion of the display.

3. The system of claim 1, wherein the program is at least one of: a channel, an advertisement, a broadcast media item, a movie, a television show, a video clip, and an Internet streaming media item.

4. The system of claim 1, wherein the first input is received from at least one: a client device, a mobile phone, a computer, a remote, a television, a remote web server, a set-top box, a track pad, a motion-tracking device, an eye-gaze device, and a voice command receiving device.

5. The system of claim 1, wherein the first input is received in at least one of the following formats: a mechanical input, a verbal input, a text-based input, a physical gesture, and an eye-gaze.

6. The system of claim 1, wherein the processor is further configured to receive a fourth input, wherein the fourth input dismisses the program guide from the third portion of the display.

7. The system of claim 1, wherein the processor is further configured to receive a fourth input, wherein the fourth input configures a translucence level of the program guide.

8. The system of claim 1, wherein the first program is determined based at least on one of: a user viewing history, a user preference, a program guide search history, a user profile, a geolocation, a time of day, and a day of the week.

9. The system of claim 1, wherein the preview of the second program is played based on a determination of a subscription level associated with a user.

10. The system of claim 1, wherein the processor is further configured to receive a fourth input, wherein the fourth input pauses the first program while the program guide is displayed in the third portion of the display.

11. The system of claim 1, wherein the processor is further configured to display a program progress bar associated with the first program.

12. The system of claim 1, wherein the processor is further configured to receive a fourth input, wherein the fourth input changes the size of the program guide in relation to the display.

13. The system of claim 1, wherein the advertisement to be played in the first portion of the display is determined based at least on one of: a user viewing history, a user preference, a program guide search history, a user profile, a geolocation, a time of day, and a day of the week.

14. A method for dynamically displaying a program guide comprising:
    playing a first program;
    receiving a first input, wherein the first input activates the program guide;
    overlaying the program guide on the first program, wherein the first program continues to play;
    receiving a second input, wherein the second input resizes the program guide in relation to the display while the first program continues to play;
    receiving a third input, wherein the third input is a selection of a second program;
    playing a preview of the second program in a background portion of the display, wherein the first portion is a foreground portion, wherein the preview of the second program is played in response to a determination regarding a time of day and a viewing frequency; and
    based on the selection of the second program, playing an advertisement, wherein the advertisement is associated with the second program.

15. The method of claim 14, further comprising receiving a fourth input, wherein the fourth input changes at least one characteristic of the program guide.

16. The method of claim 15, wherein the at least one characteristic is at least one of: a level of translucence, a size, a shape, a color, font size, and a position.

17. The method of claim 14, further comprising dynamically shifting the program guide based on content of the first program.

18. A computer-readable media storing non-transitory computer executable instructions that when executed cause a computing system to perform a method for dynamically displaying a program guide comprising:
   playing a first program;
   receiving a first input, wherein the first input activates the program guide;
   overlaying the program guide on the first program, wherein the first program continues to play;
   receiving a second input, wherein the second input is a selection of a second program within the program guide;
   playing a preview of the second program in a background portion of a display, wherein the first portion is a foreground portion;
   playing an advertisement associated with the second program while displaying the program guide, wherein the preview of the second program is played in response to a determination regarding a time of day and a viewing frequency; and
   receiving a third input, wherein the third input resizes the program guide in relation to the display.

19. The method of claim 18, further comprising receiving a fourth input, wherein the fourth input changes at least one characteristic of the program guide, the at least one characteristic comprising at least one of: a level of translucence, a size, a shape, a color, font size, and a position.

* * * * *